(12) United States Patent
Ina

(10) Patent No.: US 11,296,932 B2
(45) Date of Patent: Apr. 5, 2022

(54) TERMINAL APPARATUS, SERVER, SYSTEM, METHOD FOR TERMINAL APPARATUS, AND PROGRAM FOR TERMINAL APPARATUS

(71) Applicant: NEC Corporation, Tokyo (JP)

(72) Inventor: Keisuke Ina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/086,854

(22) Filed: Nov. 2, 2020

(65) Prior Publication Data

US 2021/0144055 A1 May 13, 2021

(30) Foreign Application Priority Data

Nov. 8, 2019 (JP) .............................. JP2019-203372

(51) Int. Cl.
*H04L 12/24* (2006.01)
*H04L 12/66* (2006.01)
(Continued)

(52) U.S. Cl.
CPC .......... *H04L 41/0803* (2013.01); *H04L 12/66* (2013.01); *H04L 67/141* (2013.01); *H04W 4/80* (2018.02); *H04W 84/12* (2013.01)

(58) Field of Classification Search
CPC ... H04L 41/0803; H04L 12/66; H04L 67/141; H04W 4/80; H04W 84/12
See application file for complete search history.

(56) References Cited

U.S. PATENT DOCUMENTS

| 7,054,924 | B1* | 5/2006 | Harvey ................. | H04L 67/303 709/203 |
| 7,522,904 | B1* | 4/2009 | Zhu ..................... | H04L 12/2898 370/338 |

(Continued)

FOREIGN PATENT DOCUMENTS

| JP | 2003-333133 A | 11/2003 |
| JP | 2009-176099 A | 8/2009 |

(Continued)

OTHER PUBLICATIONS

Japanese Office Action for JP Application No. 2019-203372 dated Nov. 10, 2020 with English Translation.

*Primary Examiner* — Patrice L Winder

(57) ABSTRACT

A terminal apparatus, a server, a system, a method for a terminal apparatus, and a program for a terminal apparatus, capable of easily making a setting of kitting data necessary for the operation of a gateway are provided. A terminal apparatus 11 according to the present disclosure includes an application unit 111 configured to transmit predetermined user information of the terminal apparatus 11 and predetermined identification information of the terminal apparatus 11 to a server 12, and receive, when the predetermined user information and the predetermined identification information are included in management data managed by the server 12, predetermined kitting data associated with the predetermined user information and the predetermined identification information from the server 12, and a radio communication unit 112 configured to transmit the predetermined kitting data to a gateway 13, the kitting data being data for making a setting necessary for an operation of the gateway 13.

3 Claims, 9 Drawing Sheets

(51) Int. Cl.
*H04L 29/08* (2006.01)
*H04L 41/0803* (2022.01)
*H04L 67/141* (2022.01)
*H04W 4/80* (2018.01)
*H04W 84/12* (2009.01)

(56) References Cited

U.S. PATENT DOCUMENTS

| | | | | |
|---|---|---|---|---|
| 9,634,857 | B2 * | 4/2017 | Lamb | H04L 41/0659 |
| 9,736,019 | B2 * | 8/2017 | Hardison | H04L 41/0813 |
| 10,673,747 | B2 * | 6/2020 | Gundersen | H04L 41/12 |
| 10,791,019 | B2 * | 9/2020 | Chew | H04L 67/1074 |
| 10,833,927 | B2 * | 11/2020 | Schallich | H04L 63/08 |
| 10,860,510 | B2 * | 12/2020 | Lefebvre | G06F 21/606 |
| 10,979,287 | B2 * | 4/2021 | Yang | H04L 67/34 |
| 2011/0110344 | A1 | 5/2011 | Kristensen et al. | |
| 2011/0222549 | A1 * | 9/2011 | Connelly | G06F 8/65 370/401 |
| 2012/0150632 | A1 * | 6/2012 | Fan | G06Q 30/01 705/14.49 |
| 2014/0143311 | A1 | 5/2014 | Shikata et al. | |
| 2016/0092644 | A1 | 3/2016 | Tanaka | |
| 2016/0270020 | A1 * | 9/2016 | Adrangi | H04L 67/02 |
| 2017/0034859 | A1 | 2/2017 | Yao | |
| 2019/0387396 | A1 * | 12/2019 | Gui | H04W 4/80 |

FOREIGN PATENT DOCUMENTS

| | | |
|---|---|---|
| JP | 2010-224828 A | 10/2010 |
| JP | 2011-517522 A | 6/2011 |
| JP | 2014-102550 A | 6/2014 |
| JP | 2014-194654 A | 10/2014 |
| JP | 2014-222468 A | 11/2014 |
| JP | 2016-071557 A | 5/2016 |
| WO | 2016/059680 A1 | 4/2016 |

\* cited by examiner

EXTENDED MANAGEMENT DATA

| USER INFORMATION OF TERMINAL APPARATUS | KITTING DATA | IDENTIFICATION INFORMATION OF TERMINAL APPARATUS | NUMBER OF TIMES OF TRANSMISSION OF PREDETERMINED KITTING DATA | CHARGING INFORMATION |
|---|---|---|---|---|
| USER U1 | X | AAAA BBBB ... | 100000 | ¥1000000 |
|  | Y | DDDD EEEE ... | 1000 | ¥100000 |
| USER U2 | Z | FFFF | 50000 | ¥500000 |

Fig. 4

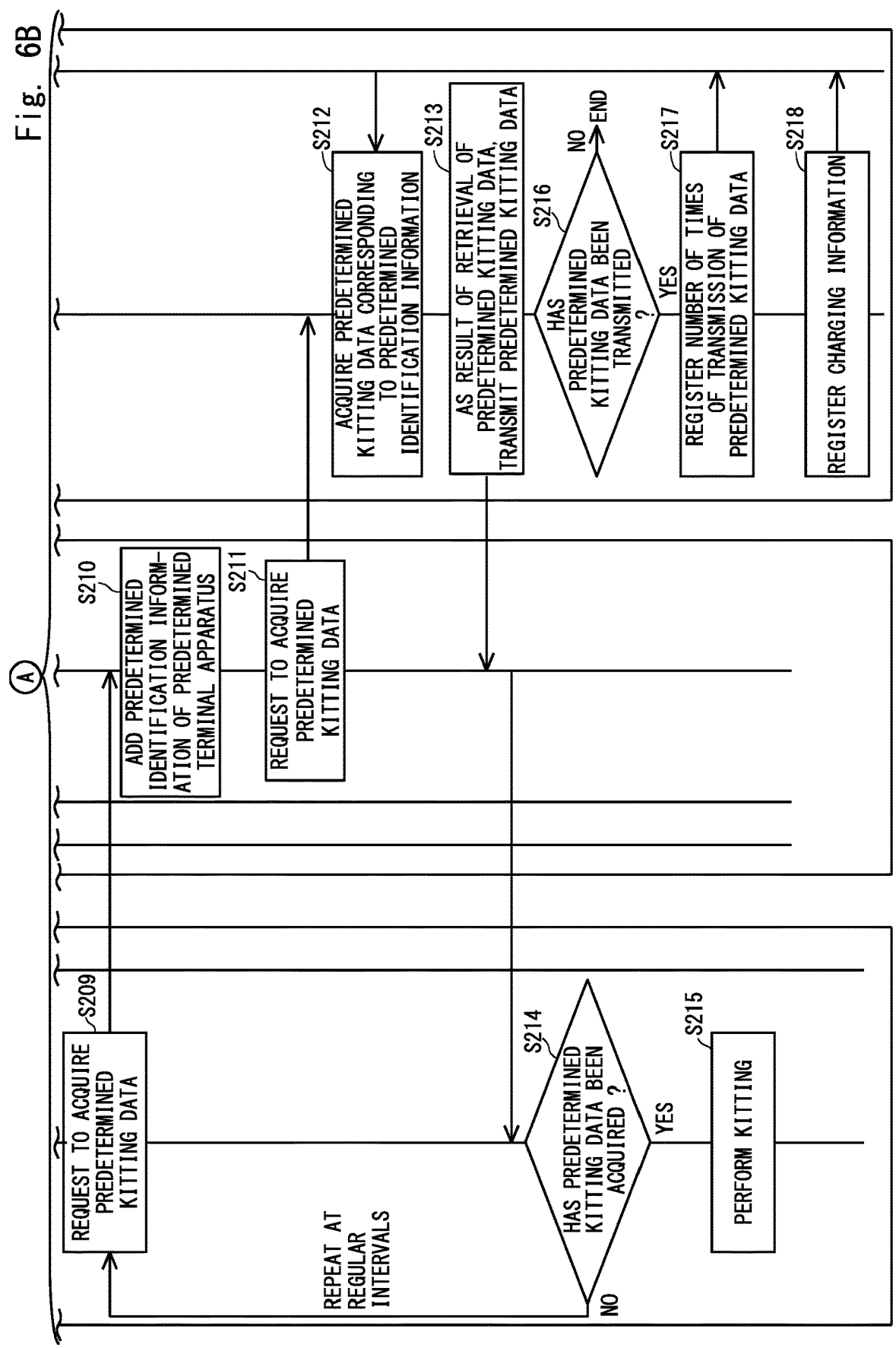

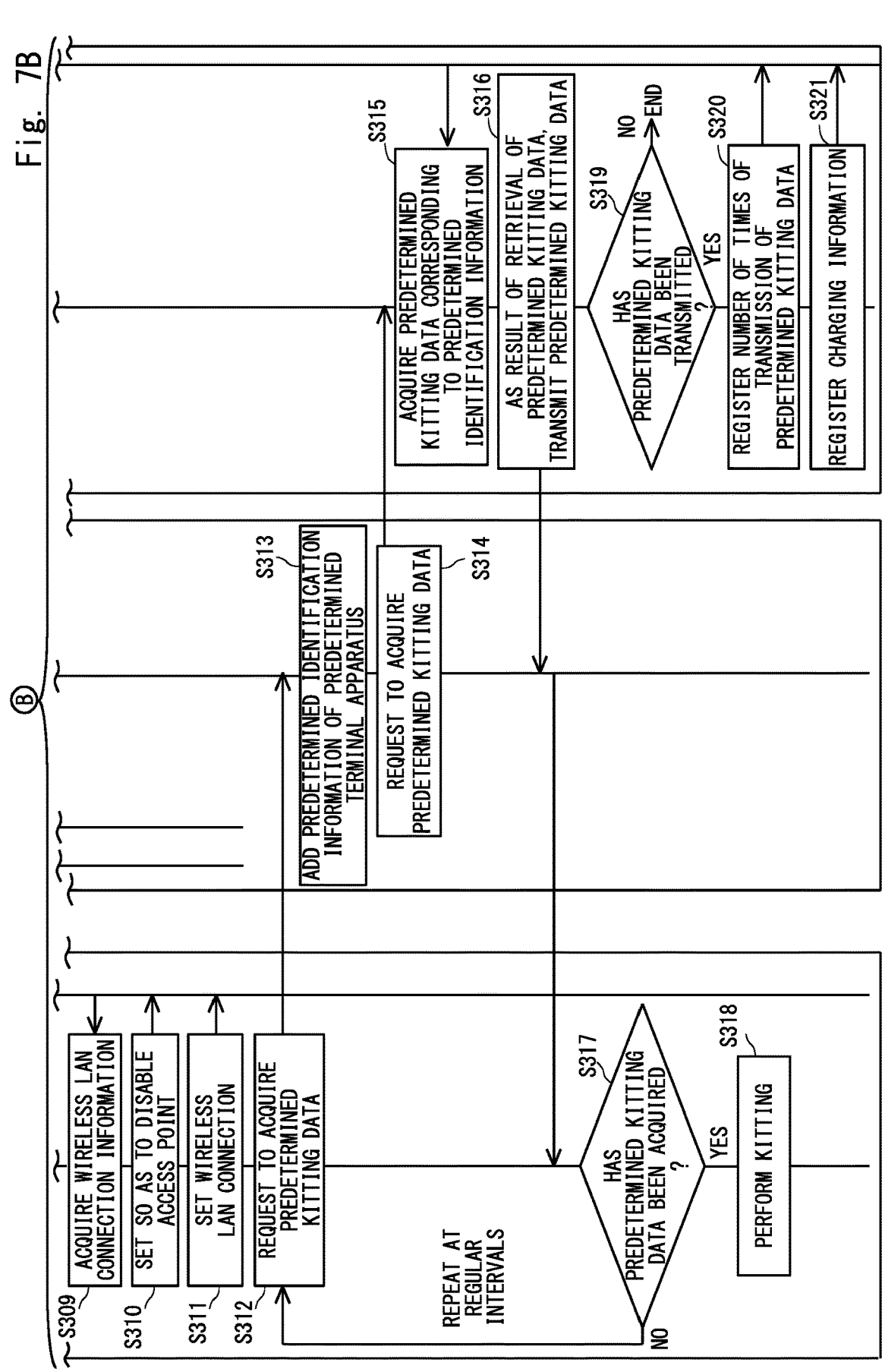

TERMINAL APPARATUS, SERVER, SYSTEM, METHOD FOR TERMINAL APPARATUS, AND PROGRAM FOR TERMINAL APPARATUS

INCORPORATION BY REFERENCE

This application is based upon and claims the benefit of priority from Japanese patent application No. 2019-203372, filed on Nov. 8, 2019, the disclosure of which is incorporated herein in its entirety by reference.

TECHNICAL FIELD

The present disclosure relates to a terminal apparatus, a server, a system, a method for a terminal apparatus, and a program for the terminal apparatus. In particular, the present disclosure relates to a terminal apparatus, a server, a system, a method for a terminal apparatus, and a program for a terminal apparatus, capable of easily making a setting of kitting data necessary for the operation of a gateway.

BACKGROUND ART

In IoT (Internet of Things) systems, there are cases in which an edge gateway is not equipped with a GUI (Graphical User Interface). In such cases, when the setting of an edge gateway is made on the site (i.e., in the place where the IOT system is installed), it is necessary to make the setting by using a CLI (Command Line Interface) or the like. Further, since a plurality of edge gateways are disposed in such an IoT system and hence their setting work on the site requires a large number of man-hours, it is necessary to, for example, automatically perform the setting work for the edge gateways through a network. However, there is a type of edge gateway that cannot be connected to a network such as the Internet. As a method for performing setting work, i.e., performing kitting for such an edge gateway, for example, there is method in which kitting data for setting is stored into a storage device such as a USB memory in advance, and then the storage device is connected to the edge gateway so that kitting can be performed off-line. However, in this method, the setting work is complicated because, for example, the storage device needs to be physically connected to the edge gateway on the site, thus raising a problem that the setting work cannot be easily performed.

In paragraph [0020] of Published Japanese Translation of PCT International Publication for Patent Application, No. 2011-517522 (hereinafter referred to as Patent Literature 1), it is stated that "this system includes a mobile phone, which can be connected to a Bluetooth access point, provides an Internet connection to a VOIP server, and provides a connection to a PSTN (Public Switched Telephone Network) through a PSTN gateway." However, Patent Literature 1 does not disclose a feature that "when predetermined user information of an own apparatus and predetermined identification information of the own apparatus are stored in a server, the own apparatus receives predetermined kitting data associated with the predetermined user information and the predetermined identification information from the server, and transmits the predetermined kitting data to a gate way, so that the setting of kitting data is easily performed".

In paragraph [0046] of Japanese Unexamined Patent Application Publication No. 2010-224828 (hereinafter referred to as Patent Literature 2), it is stated that "the computer automatic kitting system encapsulates function modules related to the setting of a computer, stores the encapsulated function modules in a function module file, and creates a work procedure table for executing function modules selected by an administrator in a designated order". Further, it is stated that "the computer automatic kitting system executes the function modules according to the work procedure table in a PC (Personal Computer) for which the setting is made, stores a log file of the execution result in a management server, detects a normal or abnormal termination of the work from the log file, and notifies the administrator of the detection". However, Patent Literature 2 does not disclose a feature that "when predetermined user information of an own apparatus and predetermined identification information of the own apparatus are stored in a server, the own apparatus receives predetermined kitting data associated with the predetermined user information and the predetermined identification information from the server, and transmits the predetermined kitting data to a gate way, so that the setting of kitting data is easily performed".

SUMMARY

As described above, there is a problem that it is difficult to set kitting data for an edge gateway.

An example object of the disclosure is to provide a terminal apparatus, a server, a system, a method for a terminal apparatus, and a program for a terminal apparatus, capable of solving the above-described problem.

In a first example aspect, a terminal apparatus includes:

an application unit configured to transmit predetermined user information of the terminal apparatus and predetermined identification information of the terminal apparatus to a server, and receive, when the predetermined user information and the predetermined identification information are included in management data managed by the server, predetermined kitting data associated with the predetermined user information and the predetermined identification information from the server; and a radio communication unit configured to transmit the predetermined kitting data to a gateway, the kitting data being data for making a setting necessary for an operation of the gateway.

In another example aspect, a server includes:

an application interface unit configured to receive user information of at least one terminal apparatus, identification information of the at least one terminal apparatus, and kitting data for making a setting necessary for an operation of a gateway from the at least one terminal apparatus; and a management unit configured to manage management data in which the user information, the identification information, and the kitting data are associated with each other, in which when predetermined user information and predetermined identification information received from a predetermined terminal apparatus among the at least one terminal apparatus are included in the management data, the application interface unit transmits predetermined kitting data associated with the predetermined user information and the predetermined identification information to the predetermined terminal apparatus.

In another example aspect, a system includes a gateway, at least one terminal apparatus, and a server, in which the server includes:

an application interface unit configured to receive user information of the at least one terminal apparatus, identification information of the at least one terminal apparatus, and kitting data for making a setting necessary for an operation of the gateway from the at least one terminal apparatus; and a management unit configured to manage management data in which the user information, the identification information, and the kitting data are associated with each other, when predetermined user information and predetermined identification information received from a predetermined terminal apparatus among the at least one terminal apparatus are included in the management data, the application interface unit transmits predetermined kitting data associated with the predetermined user information and the predetermined identification information to the predetermined terminal apparatus, each of the at least one terminal apparatus includes:

an application unit configured to transmit the predetermined user information and the predetermined identification information to the server, and receive, when the predetermined user information and the predetermined identification information are included in the management data managed by the server, the predetermined kitting data associated with the predetermined user information and the predetermined identification information from the server; and a radio communication unit configured to transmit the predetermined kitting data to the gateway, the kitting data being data for making a setting necessary for an operation of the gateway, and the gateway includes:

a gateway radio communication unit configured to receive the predetermined kitting data from the at least one terminal apparatus; and a kitting agent unit configured to set the predetermined kitting data in the gateway.

In another example aspect, a method for a terminal apparatus includes:

transmitting predetermined user information of the terminal apparatus and predetermined identification information of the terminal apparatus to a server, and receiving, when the predetermined user information and the predetermined identification information are included in management data managed by the server, predetermined kitting data associated with the predetermined user information and the predetermined identification information from the server; and transmitting the predetermined kitting data to a gateway, the kitting data being data for making a setting necessary for an operation of the gateway.

In another example aspect, a program causes a computer to:

transmit predetermined user information of the terminal apparatus and predetermined identification information of the terminal apparatus to a server, and receive, when the predetermined user information and the predetermined identification information are included in management data managed by the server, predetermined kitting data associated with the predetermined user information and the predetermined identification information from the server; and transmit the predetermined kitting data to a gateway, the kitting data being data for making a setting necessary for an operation of the gateway.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 4 shows an example of a management table according to the first example embodiment;

FIG. 6B is a sequence diagram showing an example of operations performed by the system according to the first example embodiment;

FIG. 7B is a sequence diagram showing an example of operations performed by the system according to the second example embodiment.

EMBODIMENTS

Example embodiments according to the present disclosure will be described hereinafter with reference to the drawings. The same or corresponding elements are denoted by the same symbols throughout the drawings, and redundant explanations are omitted as appropriate for the sake of clarity.

First Example Embodiment

Configurations of a server, a terminal apparatus, a gateway, and a system according to a first example embodiment will be described. The gateway according to the first example embodiment is an entity for which kitting is to be performed, and it is assumed that the gateway is not connected to a network such as the Internet.

Figure 1:
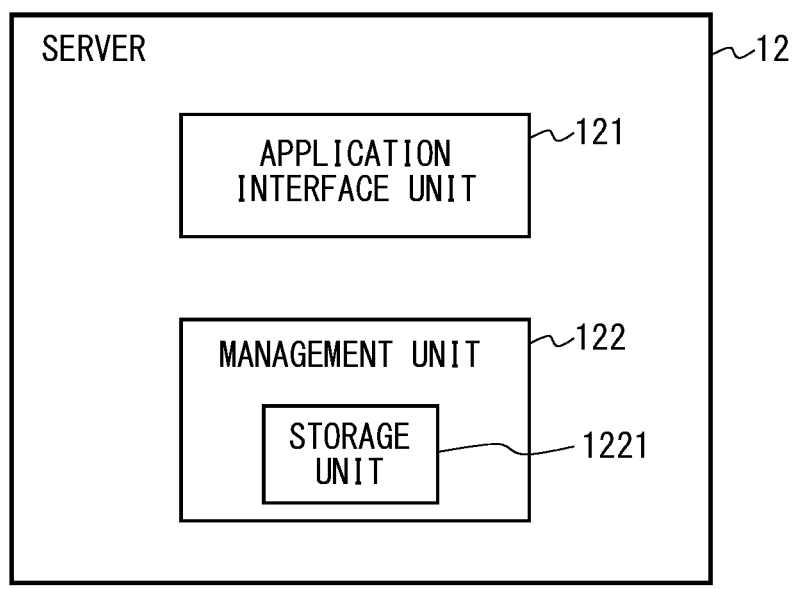
FIG. 1 is a block diagram showing an example of a server according to a first example embodiment.

FIG. 1 is a block diagram showing an example of the server according to the first example embodiment.

Figure 2:
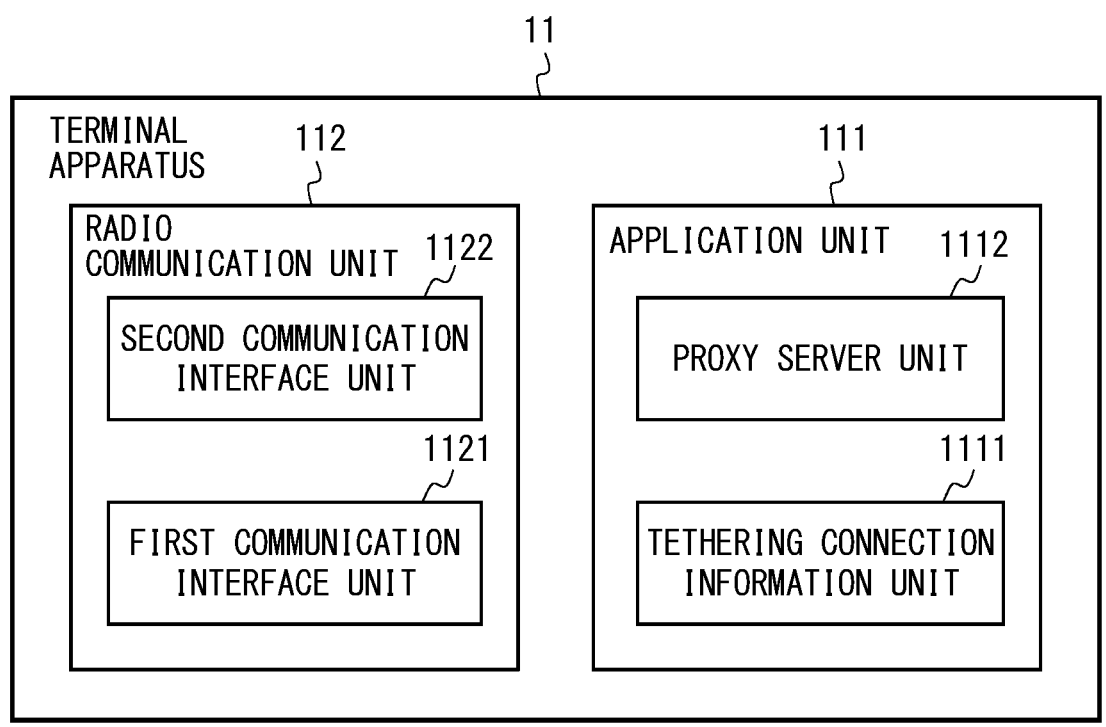
FIG. 2 is a block diagram showing an example of a terminal apparatus according to the first example embodiment.

FIG. 2 is a block diagram showing an example of the terminal apparatus according to the first example embodiment.

Figure 3:
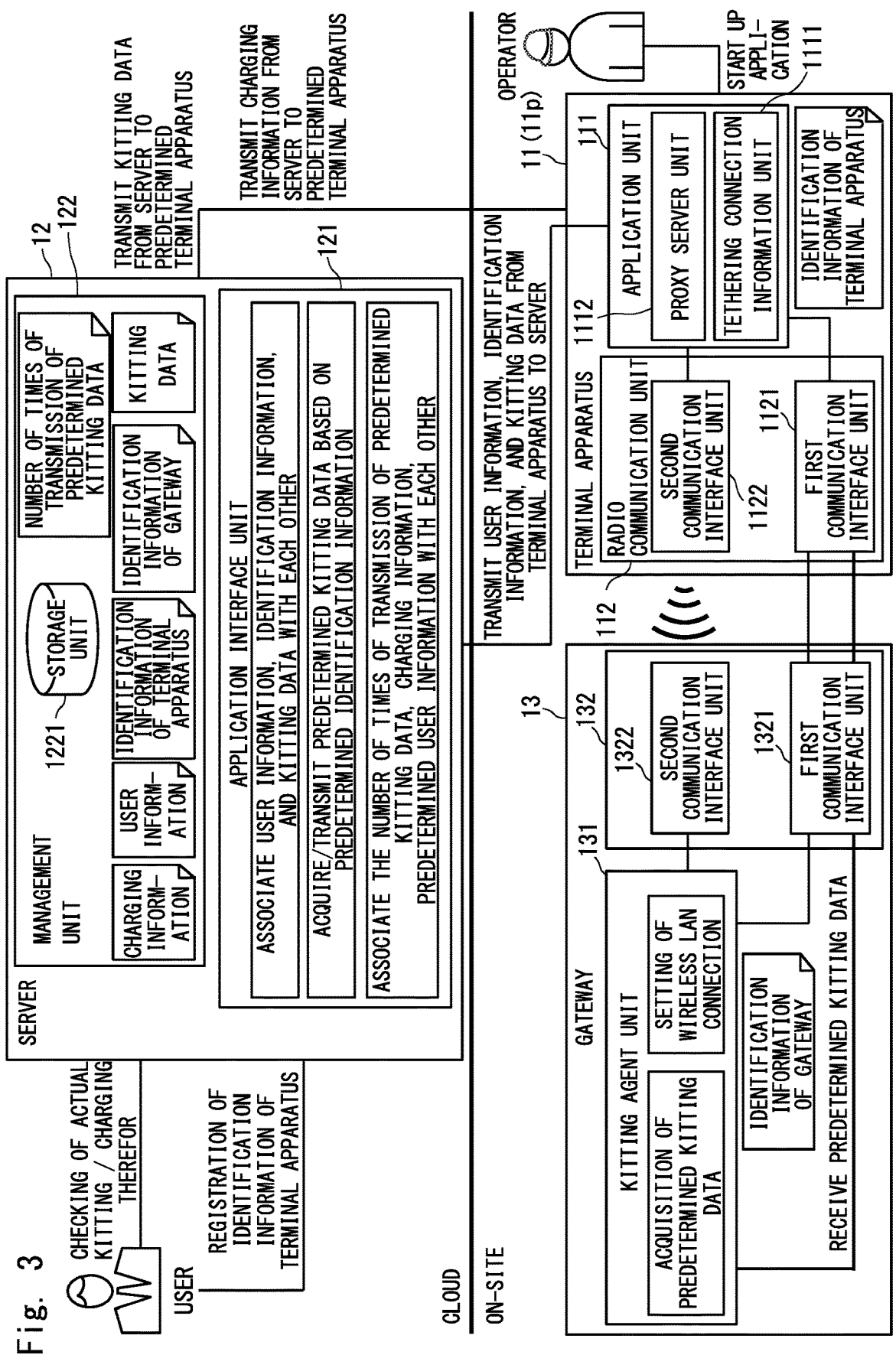
FIG. 3 is a block diagram showing an example of a system according to the first example embodiment.

FIG. 3 is a block diagram showing an example of the system according to the first example embodiment.

FIG. 4 shows an example of a management table according to the first example embodiment.

As shown in FIGS. 1 and 3, the system 10 according to the first example embodiment includes a gateway 13, a terminal apparatus 11, and a server 12.

<Server>

The server 12 will be described.

The server 12 according to the first example embodiment includes an application interface unit 121 and a management unit 122.

The application interface unit 121 communicates with at least one terminal apparatus 11. The application interface unit 121 receives user information of the at least one terminal apparatus 11, identification information of the at least one terminal apparatus 11, and kitting data for making a setting necessary for the operation of the gateway 13 from the at least one terminal apparatus 11. The application interface unit is also referred to as an API server.

The management unit 122 manages management data in which the user information, the identification information, and the kitting data are associated with each other. The reason why the management unit 122 associates the user information of the at least one terminal apparatus 11 with the identification information of the at least one terminal apparatus 11 in advance is that an operator on the site (i.e., an operator present in the place where the system is installed) performs kitting for the gateway 13 on the site by using a predetermined terminal apparatus 11p from among the at least one terminal apparatus 11.

The server 12 may further include a storage unit 1221 that stores (saves) the management data. The storage unit is also referred to as a database.

When the predetermined user information and the predetermined identification information received from the predetermined terminal apparatus 11p among the at least one terminal apparatus 11 are included in the management data, the application interface unit 121 transmits predetermined kitting data associated with the predetermined user information and the predetermined identification information to the predetermined terminal apparatus 11p. The user information of the predetermined terminal apparatus 11p is referred to as predetermined user information, and the identification information of the predetermined terminal apparatus 11p is referred to as predetermined identification information.

The management unit 122 adds information about the number of times of transmission of the predetermined kitting data to the predetermined terminal apparatus 11p and charging information calculated based on the number of times of transmission of the predetermined kitting data in the management data and manages the management data including these information pieces as extended management data. For example, the charging information may be generated by multiplying the number of times of transmission of the predetermined kitting data by a constant value, i.e., by a unit price. By using the predetermined identification information of the terminal apparatus 11 as the information for associating the predetermined user information with the number of times of transmission of the predetermined kitting data, it is possible to automatically associate them with each other. The application interface unit 121 transmits the charging information to the predetermined terminal apparatus 11p based on the extended management data, and the transmitted extended management data is stored into the storage unit 1221.

Note that when one user transmits kitting data by using a plurality of terminal apparatuses 11, the charging information may be calculated by adding up those of all of these terminal apparatuses 11. Further, when one user transmits kitting data to a plurality of gateways 13 by using the terminal apparatus(es) 11, the charging information may be calculated by adding up those of all of these gateways 13.

As shown in FIG. 4, in addition to the user information of the terminal apparatus 11, the identification information of the terminal apparatus 11, and the kitting data, the number of times of transmission of the predetermined kitting data (the number of times of delivery or the number of times of execution) is associated with the charging information in the extended management data. Among these information pieces, the user information, the identification information, and the kitting data are registered in advance in the server 12 before the user performs kitting for the gateway 13. Note that the management unit 122 may manage identification information of the gateway 13 by adding it in the extended management data.

The operator on the site relays the predetermined kitting data by using the terminal apparatus 11 of which the identification information is registered in advance, and thereby performs kitting for the gateway 13. The user information and the number of times of kitting (the number of times of transmission of the predetermined kitting data) are associated with each other and registered. In this way, the server 12 charges the user based on the number of times of transmission of the predetermined kitting data.

The management unit 122 manages extended management data for each user. Referring to FIG. 4, a user U1 transmits kitting data X to the gateway 13 100,000 times by using the terminal apparatus 11 such as one having identification information AAAA or one having identification information BBBB, and the amount of the charge for the transmission is 1,000,000 yen.

Note that the gateway is also referred to as a kitting gateway. The server is also referred to as a kitting server. The terminal apparatus is also referred to as a portable terminal. The terminal apparatus is, for example, a smartphone.

<Terminal Apparatus>

The terminal apparatus 11 will be described.

As shown in FIGS. 2 and 3, the terminal apparatus 11 according to the first example embodiment includes an application unit 111 and a radio communication unit 112.

The application unit 111 transmits predetermined user information of its own apparatus (the predetermined terminal apparatus 11p) and predetermined identification information of its own apparatus (the predetermined terminal apparatus 11p) to the server 12.

When the predetermined user information and the predetermined identification information are included in the management data managed by the server 12, the application unit 111 receives predetermined kitting data associated with the predetermined user information and the predetermined identification information from the server 12.

The application unit 111 includes a tethering connection information unit 1111 and a proxy server unit 1112. The tethering connection information unit 1111 has a tethering connection function, and the proxy server unit 1112 has a proxy server function. The application unit 111 connects to the gateway 13 through the radio communication unit 112 by using the tethering connection function, connects to the server 12 by using the proxy server function, and thereby relays the connection between the server 12 and the gateway 13.

The radio communication unit 112 transmits predetermined kitting data to the gateway 13. The predetermined kitting data is data for making a setting necessary for the operation of the gateway 13. When the terminal apparatus 11 transmits the predetermined kitting data to the gateway 13, it transmits the predetermined kitting data to the gateway 13 in a non-contact manner by using the tethering connection function, so that the terminal apparatus 11 can perform kitting through a network.

Note that the connection between the terminal apparatus 11 and the gateway 13 may be established and used as described below.

The radio communication unit 112 includes a first communication interface unit 1121 and a second communication interface unit 1122. The radio communication unit 112 transmits connection information for the connection of the first communication interface unit 1121 to the gateway 13 through the second communication interface unit 1122. After transmitting the connection information to the gateway 13, the radio communication unit 112 connects to the gateway 13 through the first communication interface unit 1121 based on the connection information. After connecting to the gateway 13 through the first communication interface unit 1121, the radio communication unit 112 transmits predetermined kitting data to the gateway 13 through the first communication interface unit 1121.

The first communication interface unit 1121 may be, for example, an interface for a wireless LAN (Local Area Network). The second communication interface unit 1122 may be, for example, an interface for Bluetooth (Registered Trademark). In this case, the radio communication unit 112 transmits the connection information for the connection for the wireless LAN to the gateway 13 by using Bluetooth. Note that the connection information for the connection for the wireless LAN is also referred to as tethering connection information.

After that, the first communication interface unit 1121 connects to the gateway 13 by using the tethering function of the wireless LAN. The tethering function is also referred to as a tethering connection function. The terminal apparatus 11 connects the gateway 13 with the server 12 through the terminal apparatus 11 by transmitting the tethering connection information by using, for example, an advertise packet of Bluetooth.

Note that the first communication interface is also referred to as a first radio communication interface, and the second communication interface is also referred to as a second radio communication interface.

<Gateway>

The gateway 13 will be described.

In first example embodiment, the gateway 13 is an entity for which kitting is performed.

The gateway 13 includes a gateway radio communication unit 132 and a kitting agent unit 131.

The gateway radio communication unit 132 receives predetermined kitting data from the terminal apparatus 11 (the predetermined terminal apparatus 11p). The gateway radio communication unit 132 includes a first communication interface unit 1321 and a second communication interface unit 1322. The first communication interface unit 1321 is, for example, an interface for a wireless LAN and connects to the first communication interface unit 1121 of the terminal apparatus 11. Further, the second communication interface unit 1322 is, for example, an interface for Bluetooth and connects to the second communication interface unit 1122 of the terminal apparatus 11.

The kitting agent unit 131 sets the predetermined kitting data in the gateway 13.

Operations performed by a system according to the first example embodiment will be described.

In the following description of the operations performed by the system, an example in which a wireless LAN transmitting/receiving unit is used as the first communication interface unit 1121 of the terminal apparatus 11 and a Bluetooth transmitting unit is used as the second communication interface unit 1122 thereof is explained. Further, in the example, a wireless LAN transmitting/receiving unit is used as the first communication interface unit 1321 of the gateway 13 and a Bluetooth receiving unit is used as the second communication interface unit 1322 thereof.

Figure 5:
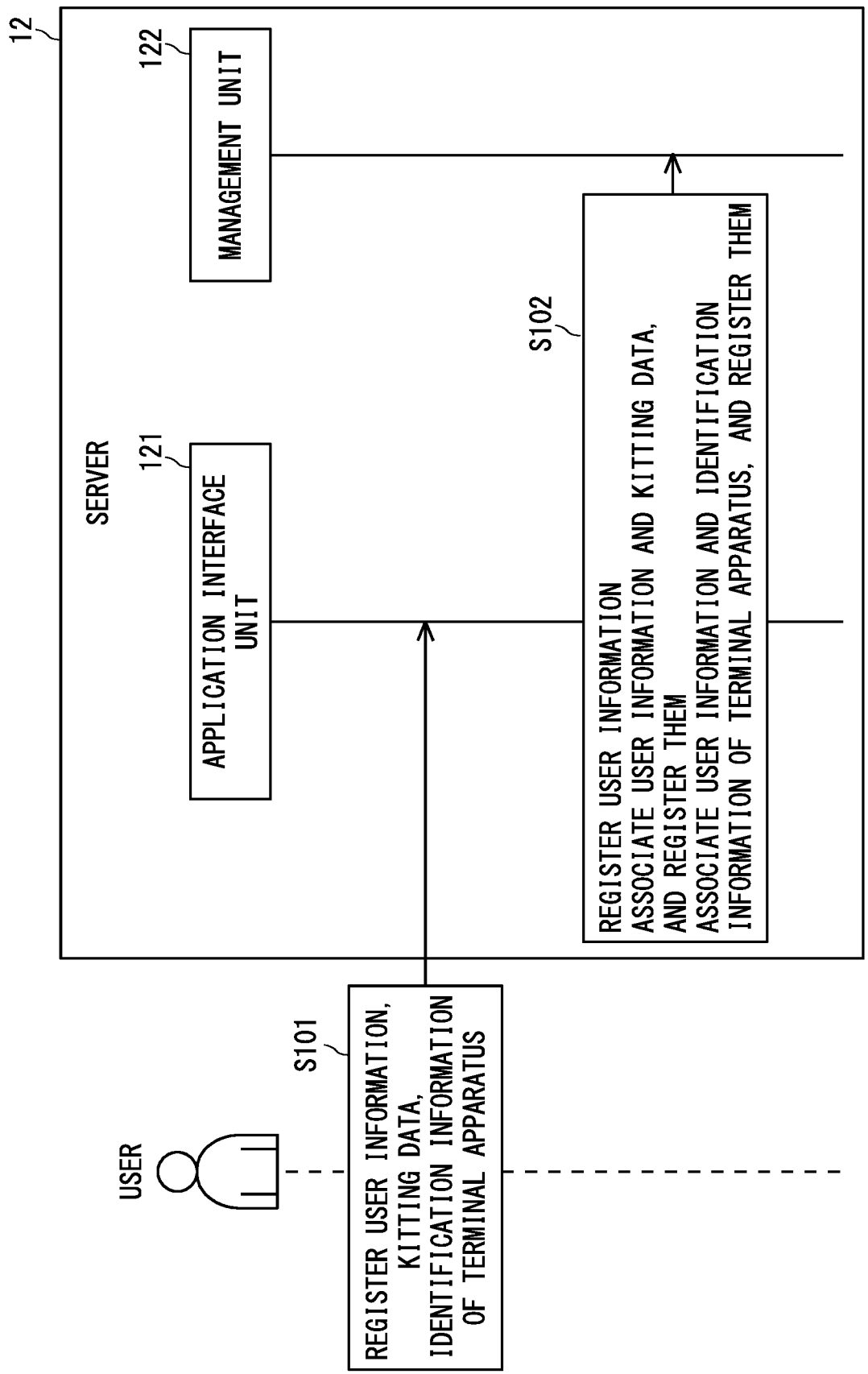
FIG. 5 is a sequence diagram showing an example of operations performed by the system according to the first example embodiment.

FIG. 5 is a sequence diagram showing an example of operations performed by the system according to the first example embodiment.

Figure 6A:
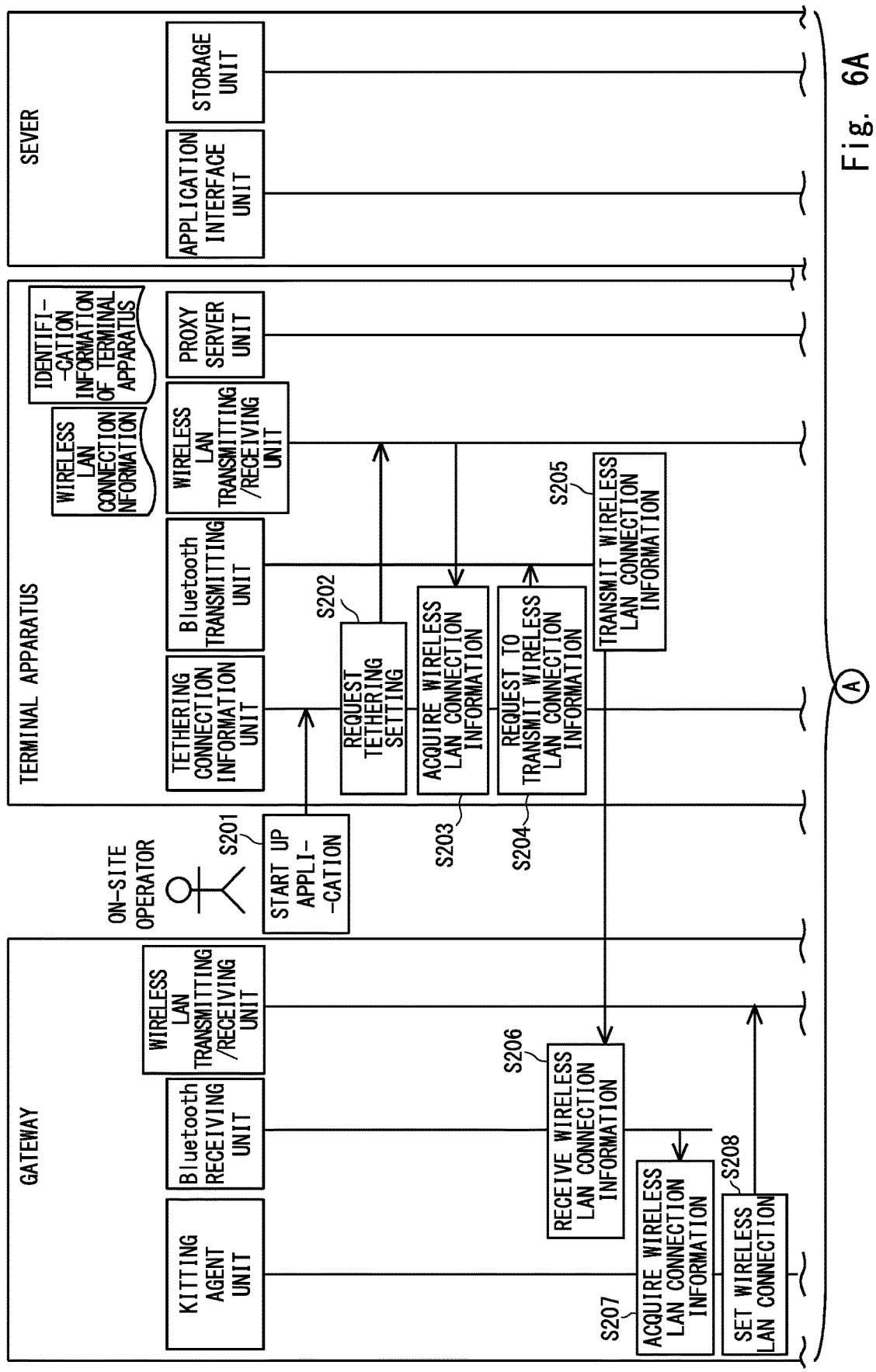
FIG. 6A is a sequence diagram showing an example of operations performed by the system according to the first example embodiment.

FIG. 6A is a sequence diagram showing an example of operations performed by the system according to the first example embodiment.

FIG. 6B is a sequence diagram showing an example of operations performed by the system according to the first example embodiment.

As shown in FIG. 5, before kitting is performed on the site (i.e., in the place where the system is installed), each of at least one terminal apparatus 11 transmits user information of the terminal apparatus 11, identification information of the terminal apparatus 11, and kitting data to the server 12, and thereby registers these information pieces in the server 12 (step S101).

The application interface unit 121 of the server 12 associates the kitting data and the identification information with the user information, and registers these information pieces (step S102). Note that a plurality of kitting data and a plurality of identification information may be registered.

As shown in FIG. 6A, an operator on the site starts up a kitting application of the tethering connection information unit 1111 by using the predetermined terminal apparatus 11p among the at least one terminal apparatus 11 in which the identification information is registered in a step S102 (step S201).

The kitting application makes a tethering setting request for a tethering enable setting so that a wireless LAN connection from the gateway 13 can be established for the wireless LAN transmitting/receiving unit (step S202).

The kitting application acquires wireless LAN connection information from the wireless LAN transmitting/receiving unit (step S203).

The kitting application requests the Bluetooth transmitting unit to transmit the wireless LAN connection information (step S204).

The Bluetooth transmitting unit transmits the wireless LAN connection information to the gateway 13 (step S205).

The Bluetooth receiving unit of the gateway 13, for which kitting is to be performed, scans (i.e., searches for) the Bluetooth device present near the gateway 13 and receives the wireless LAN connection information of the predetermined terminal apparatus 11p from the Bluetooth device (step S206).

The kitting agent unit 131 acquires the wireless LAN connection information received by the Bluetooth receiving unit (step S207).

The kitting agent unit 131 sets the wireless LAN connection information for the wireless LAN transceiver unit (step S208).

As shown in FIG. 6B, after completing the wireless LAN connection setting, the kitting agent unit 131 makes a request for acquiring the predetermined kiting data to the server 12 through the predetermined terminal apparatus 11p (step S209).

A communication relay unit of the proxy server unit 1112 of the predetermined terminal apparatus 11p adds predetermined identification information of the predetermined terminal apparatus 11p in the received acquisition request for the predetermined kitting data (step S210).

The communication relay unit relays (i.e., receives) the acquisition request for the kitting data and transmits it to the server 12 (step S211).

The application interface unit 121 of the server 12 retrieves (i.e., searches for) the predetermined identification information of the predetermined terminal apparatus 11p from the management table (a database) managed by the management unit 122, and acquires predetermined kitting data corresponding to the predetermined identification information (step S212).

As a result of the search of the predetermined kitting data in the step S212, when there is the predetermined kitting data, the application interface unit 121 transmits the content of the predetermined kitting data to the kitting agent unit 131 (step S213).

When the kitting agent unit 131 has acquired the predetermined kitting data (step S214: Yes), it performs kitting according to the content of the kitting data (step S215).

When the kitting agent unit 131 has not acquired the predetermined kitting data (step S214: No), it repeats the acquisition request for the predetermined kitting data at regular intervals.

When the application interface unit 121 of the server 12 has not transmitted the predetermined kitting data in the step S213 (step S216: No), it finishes the process.

When the application interface unit 121 has transmitted the predetermined kitting data (step S216: Yes), it retrieves (i.e., searches for) the predetermined identification information of the predetermined terminal apparatus 11$p$ from the management data. The application interface unit 121 increments a value representing the number of times of transmission of predetermined kitting data stored in a number-of-times-of-transmission field for the predetermined kitting data corresponding to the retrieved predetermined identification information, and registers (stores) the incremented value into the same field again (step S217).

Further, the application interface unit 121 also registers a value representing the charging information corresponding to the number of times of transmission of the predetermined kitting data in a charging-information field for the predetermined kitting data corresponding to the retrieved predetermined identification information (step S218).

Note that it is assumed that the method for calculating the value registered in the charging-information field is to multiply the number of times of transmission of the predetermined kitting data by a constant value, i.e., by a unit price.

In the first example embodiment, when the predetermined user information of the predetermined terminal apparatus 11$p$ and the predetermined identification information of the predetermined terminal apparatus 11$p$ are stored in the server 12, the predetermined terminal apparatus 11$p$ receives predetermined kitting data associated with the predetermined user information and the predetermined identification information from the server 12. Then, the predetermined terminal apparatus 11$p$ transmits the received predetermined kitting data to the gateway 13. The gateway 13 sets the received predetermined kitting data in the gateway 13 itself and starts operating according to the set kitting data.

In this way, even when the gateway 13 is installed in an environment where it is not connected to a network such as the Internet, it is possible to perform kitting for the gateway 13 from the server 12 in which the predetermined kitting data is stored through the predetermined terminal apparatus 11$p$.

As a result, according to the first example embodiment, it is possible to provide a terminal apparatus, a server, a system, a method for a terminal apparatus, and a program for a terminal apparatus, capable of easily making a setting of kitting data necessary for the operation of a gateway.

Further, according to the first example embodiment, the server 12 manages the number of times of transmission of predetermined kitting data and charging information calculated based on the number of times of transmission of the predetermined kitting data by adding them in the management data. In this way, it is possible to automatically calculate the charging information based on the actual use of the predetermined kitting data, i.e., based on the number of times of transmission of the predetermined kitting data.

Further, the predetermined terminal apparatus 11$p$ transmits the predetermined kitting data to the gateway 13 by using, for example, a wireless LAN. In this way, it is possible to start kitting for the gateway 13 in a non-contact manner.

Note that in first example embodiment, Bluetooth is used for receiving the tethering connection information of the terminal apparatus 11, but it is not limited to the use of Bluetooth. In the first example embodiment, the tethering connection information may be received by using other methods.

Features of the system 10 according to the first example embodiment will be described hereinafter.

The system 10 according to the first example embodiment is a system by which an operator on the site (i.e., an operator present in the place where the system is installed), who performs an operation for kitting for the gateway 13 installed in an environment in which it cannot be connected to a network such as the Internet, can perform kitting for the gateway 13 in a non-contact manner by using radio communication between the predetermined terminal apparatus 11$p$ associated with user information and the gateway 13 through Bluetooth and a wireless LAN. The user information, the gateway 13, and the kitting data are associated with each other by using the identification information of the terminal apparatus 11, so that kitting can be easily performed from the server 12 through a network. Further, the user is charged by managing the number of gateways 13 for which kitting has already been performed and the user information while associating them with each other.

Second Example Embodiment

Operations performed by a system according to a second example embodiment will be described.

Figure 7A:
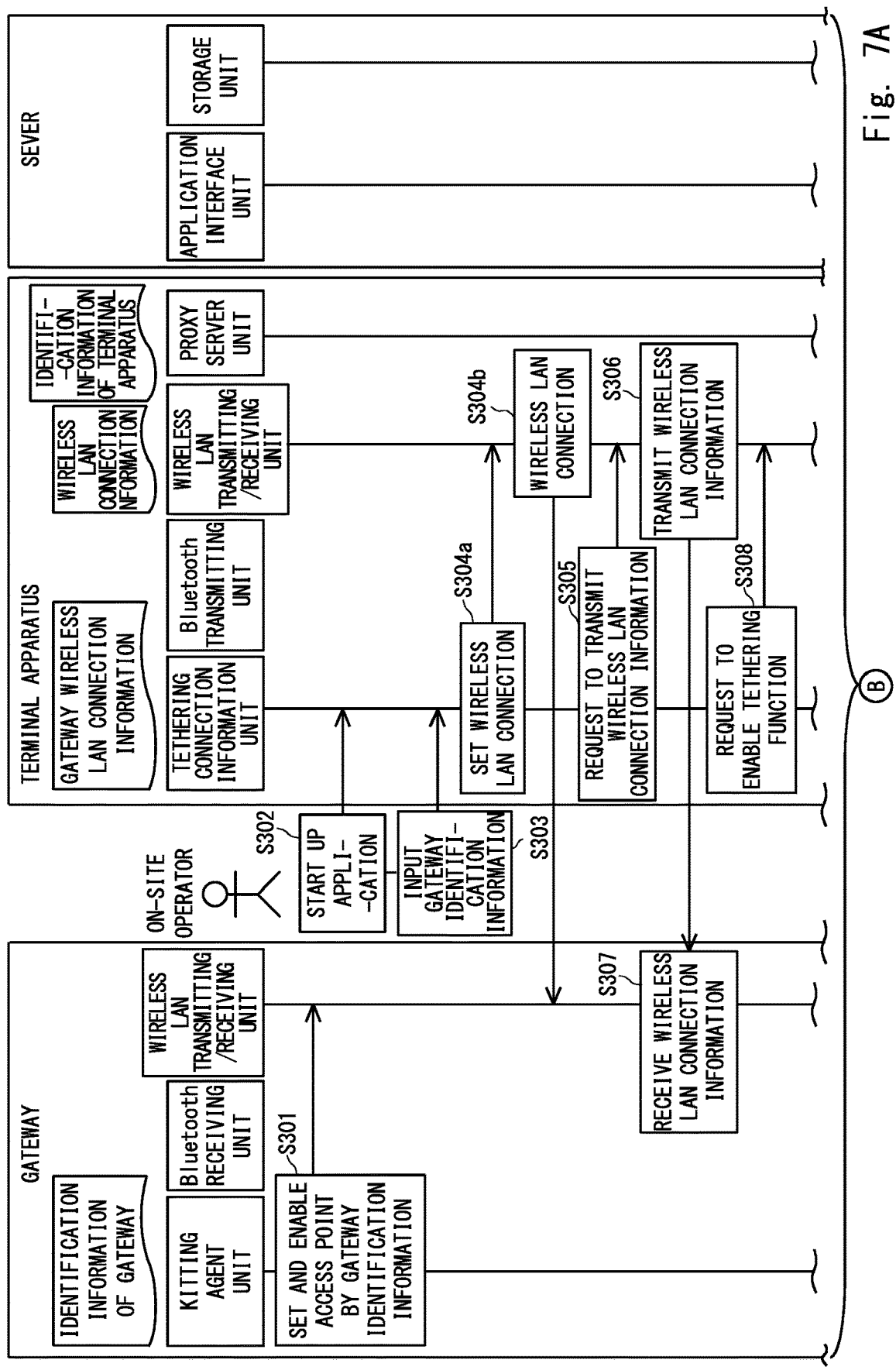
FIG. 7A a sequence diagram showing an example of operations performed by a system according to a second example embodiment.

FIG. 7A is a sequence diagram showing an example of operations performed by the system according to the second example embodiment.

FIG. 7B is a sequence diagram showing an example of operations performed by the system according to the second example embodiment.

As shown in FIG. 7A, the system 20 according to the second example embodiment is different from the system 10 according to the first example embodiment because the wireless LAN connection information, i.e., the tethering connection information is transmitted by using a wireless LAN access point provided in a gateway 23.

Specifically, a kitting agent unit 231 of the gateway 23 sets, for the wireless LAN transmitting/receiving unit, identification information of the gateway 23 in the wireless LAN connection information, and thereby sets and enables the wireless LAN access point (step S301). The identification information of the gateway 23 used in this process is information that can be externally identified, for example, is a serial product number of the gateway 23. An operator on the site starts up a kitting application of a tethering connection information unit 2111 by using a predetermined terminal apparatus 21$p$ registered in the step S301 among pieces of identification information of the at least one terminal apparatus 21 (step S302).

After the step S301, the operator on the site inputs the identification information of the gateway 23, for which kitting is to be performed, to the kitting application (step S303). Note that the identification information may be automatically input to the kitting application of the gateway 23 after a predetermined time has elapsed after the step S301 without the intervention of the operator.

The kitting application sets a wireless LAN connection for a wireless LAN access point provided in the gateway 23 by using the identification information of the gateway 23 input to the wireless LAN transmitting/receiving unit of the predetermined terminal apparatus 21p (step S304a).

The wireless LAN transmitting/receiving unit of the predetermined terminal apparatus 21p establishes the wireless LAN connection for the wireless LAN access point for the wireless LAN transmitting/receiving unit of the gateway 23 (step S304b).

After completing the wireless LAN connection for the wireless LAN access point, the kitting application requests the wireless LAN transmitting/receiving unit of the predetermined terminal apparatus 21p to transmit wireless LAN connection information (tethering connection information) for establishing a wireless LAN connection different from that for the wireless LAN access point (step S305).

The wireless LAN transmitting/receiving unit of the predetermined terminal apparatus 21p transmits the wireless LAN connection information to the wireless LAN transmitting/receiving unit of the gateway 23 (step S306).

The wireless LAN transmitting/receiving unit of the gateway 23 receives the wireless LAN connection information from the wireless LAN transmitting/receiving unit of the predetermined terminal apparatus 21p (step S307).

After completing the transmission of the wireless LAN connection information of the predetermined terminal apparatus 21p by the wireless LAN transmitting/receiving unit, the kitting application requests the wireless LAN transmitting/receiving unit to enable a tethering function so that it can establishes a wireless LAN connection with the gateway 23 (step S308).

As shown in FIG. 7B, the kitting agent unit 231 of the gateway 23 acquires the wireless LAN connection information of the predetermined terminal apparatus 21p from the wireless LAN transmitting/receiving unit of the gateway 23 (step S309).

The kitting agent unit 231 sets the wireless LAN transmitting/receiving unit so that the wireless LAN access point is disabled (step S310).

In accordance with the wireless LAN connection information received from the predetermined terminal apparatus 21p, the kitting agent unit 231 makes, for the wireless LAN transmitting/receiving unit, a wireless LAN connection setting (tethering connection information) for establishing a wireless LAN connection different from that for the wireless LAN access point (step S311).

Processes in the step S312 and subsequent steps are similar to those in the step S209 and subsequent steps in the first example embodiment, and therefore the descriptions thereof are omitted.

The system 20 according to the second example embodiment transmits tethering connection information for a wireless LAN by using the wireless LAN access point provided in the gateway 23. In this way, a wireless LAN connection is established between the predetermined terminal apparatus 21p and the gateway 23, and kitting data is transmitted to the gateway 23 by using the established wireless LAN connection. As a result, according to the second example embodiment, it is also possible to provide a terminal apparatus, a server, a system, a method for a terminal apparatus, and a program for a terminal apparatus, capable of easily making a setting of kitting data necessary for the operation of a gateway.

Note that although the present disclosure is described as a hardware configuration in the above-described example embodiments, the present disclosure is not limited to the hardware configurations. In the present disclosure, the processes in each of the components can also be implemented by having a CPU (Central Processing Unit) execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a radio communication line.

Note that the present disclosure is not limited to the above-described example embodiments and various changes may be made therein without departing from the spirit and scope of the present disclosure.

Each of the above-described embodiments can be combined as desirable by one of ordinary skill in the art.

The first and second embodiments can be combined as desirable by one of ordinary skill in the art.)

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

According to the present disclosure, it is possible to provide a terminal apparatus, a server, a system, a method for a terminal apparatus, and a program for a terminal apparatus, capable of easily making a setting of kitting data necessary for the operation of a gateway.

DESCRIPTION OF THE REFERENCE NUMERALS

10 SYSTEM
11, 21 TERMINAL APPARATUS
11p, 21p PREDETERMINED TERMINAL APPARATUS
111 APPLICATION UNIT
1111, 2111 TETHERING CONNECTION INFORMATION UNIT
1112 PROXY SERVER UNIT
112 RADIO COMMUNICATION UNIT
1121 FIRST COMMUNICATION INTERFACE UNIT
1122 SECOND COMMUNICATION INTERFACE UNIT
12 SERVER
121 APPLICATION INTERFACE UNIT
122 MANAGEMENT UNIT
1221 STORAGE UNIT
13, 23 GATEWAY
131 KITTING AGENT UNIT
132 GATEWAY RADIO COMMUNICATION UNIT
1321 FIRST COMMUNICATION INTERFACE UNIT
1322 SECOND COMMUNICATION INTERFACE UNIT
U1, U2 USER
X, Y, Z KITTING DATA

AAAA, BBBB, DDDD, EEEE, FFFF IDENTIFICATION
INFORMATION

What is claimed is:

1. A server comprising:
a processor; and
a memory storing instructions executable by the processor to:
receive user information of at least one terminal apparatus, identification information of the at least one terminal apparatus, and kitting data for making a setting necessary for an operation of a gateway from the at least one terminal apparatus; and
manage management data in which the user information, the identification information, and the kitting data are associated with each other, wherein
when predetermined user information and predetermined identification information received from a predetermined terminal apparatus from among the at least one terminal apparatus are included in the management data, the processor transmits predetermined kitting data associated with the predetermined user information and the predetermined identification information to the predetermined terminal apparatus, wherein
the processor adds information about the number of times of transmission of the predetermined kitting data to the predetermined terminal apparatus and charging information calculated based on the number of times of transmission of the predetermined kitting data in the management data, and manages the management data including these information pieces as extended management data, and
the processor transmits the charging information to the predetermined terminal apparatus based on the extended management data.

2. The server according to claim 1, wherein the processor is further to store the management data.

3. A system comprising a gateway, at least one terminal apparatus, and a server, wherein
the server comprises:
a first processor; and
a first memory storing instructions executable by the first processor to:
receive user information of the at least one terminal apparatus, identification information of the at least one terminal apparatus, and kitting data for making a setting necessary for an operation of the gateway from the at least one terminal apparatus; and
manage management data in which the user information, the identification information, and the kitting data are associated with each other,
when predetermined user information and predetermined identification information received from a predetermined terminal apparatus from among the at least one terminal apparatus are included in the management data, the first processor transmits predetermined kitting data associated with the predetermined user information and the predetermined identification information to the predetermined terminal apparatus, wherein
the first processor adds information about the number of times of transmission of the predetermined kitting data to the predetermined terminal apparatus and charging information calculated based on the number of times of transmission of the predetermined kitting data in the management data, and manages the management data including these information pieces as extended management data, and
the first processor transmits the charging information to the predetermined terminal apparatus based on the extended management data,
each of the at least one terminal apparatus comprises:
a second processor; and
a second memory storing instructions executable by the second processor to:
transmit the predetermined user information and the predetermined identification information to the server, and
receive, when the predetermined user information and the predetermined identification information are included in the management data managed by the server, the predetermined kitting data associated with the predetermined user information and the predetermined identification information from the server; and
transmit the predetermined kitting data to the gateway, the kitting data being data for making a setting necessary for an operation of the gateway, and
the gateway comprises:
a third processor; and
a third memory storing instructions executable by the third processor to:
receive the predetermined kitting data from the at least one terminal apparatus; and
set the predetermined kitting data in the gateway.

* * * * *